June 25, 1963  R. MÜLLER  3,094,975
GOVERNOR
Filed Sept. 6, 1960  2 Sheets-Sheet 1

INVENTOR
Reinhard Müller
BY
Patent Agent

June 25, 1963 R. MÜLLER 3,094,975
GOVERNOR

Filed Sept. 6, 1960 2 Sheets-Sheet 2

INVENTOR
Reinhard Müller
BY
Walter Becker
Patent Agent

United States Patent Office 3,094,975
Patented June 25, 1963

3,094,975
GOVERNOR
Reinhard Müller, Cologne-Deutz, Germany, assignor to Klockner-Humboldt-Deutz Aktiengesellschaft, Cologne-Deutz, Germany
Filed Sept. 6, 1960, Ser. No. 57,863
Claims priority, application Germany Sept. 22, 1959
4 Claims. (Cl. 123—41.12)

The present invention relates to so-called proportional governors according to which the control magnitude continually changes in the same direction from the start of operation while the customary control starts only as soon as the control magnitude has reached a certain value.

Proportional governors of this type are advantageously employed when the necessity exists to derive the control magnitude, i.e. the magnitude which is to be controlled from a point where disturbing variations become effective immediately after the start of operation in a more or less delayed manner. This retardation or delay is a phenomenon which in many instances may not only be undesirable but may even, under certain circumstances, endanger the elements forming the control distance or control section.

It is, therefore, an object of the present invention to provide a governor which will overcome the above mentioned drawbacks.

It is another object of this invention to provide a proportional governor for the control of the cooling of air-cooled internal combustion engines, which will make it possible so to control the cooling of the cylinders that the cylinder will be properly cooled already at the start and will stay cooled, even though to a lesser extent, until the normal stable control of the cooling of the cylinders.

These and other objects and advantages of the invention will appear more clearly from the following specification in connection with the accompanying drawings, in which.

Figure 4:
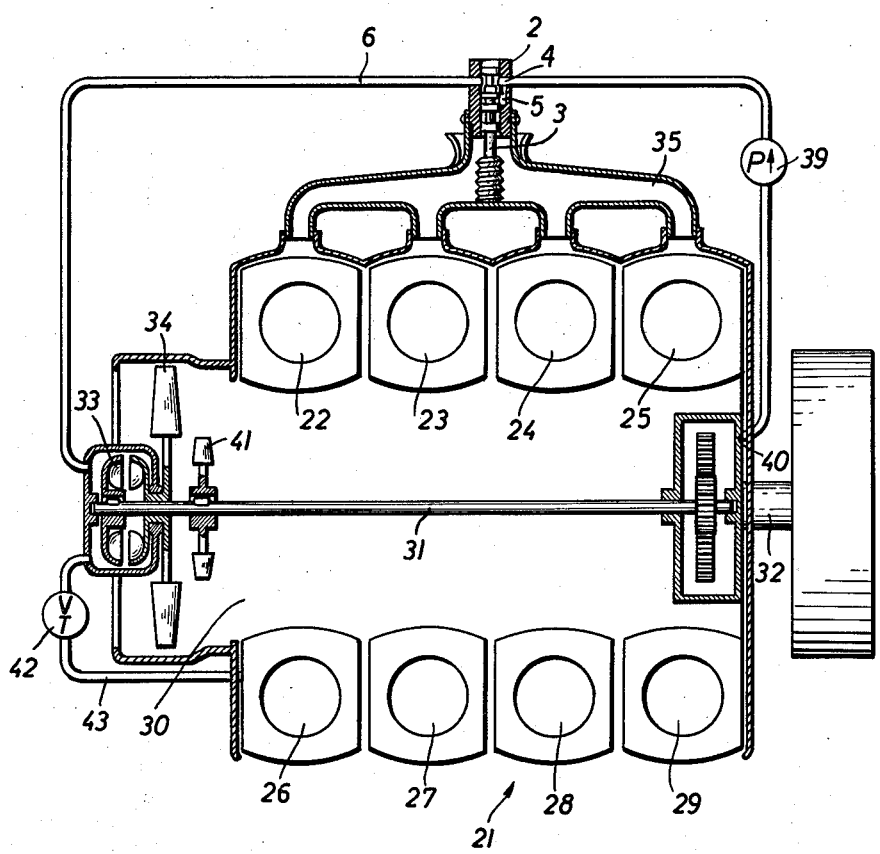

FIG. 4 diagrammatically illustrates the connection of an internal combustion engine with a proportional governor according to the invention.

General Arrangement

The objects of the present invention have been materialized by the proportional governor according to the present invention which is characterized in that the control magnitude will, prior to reaching the value at which the normal stable operation of the control starts, control the adjusting value in an inverse sense to the control in the customary control range. Thus, with a governor of this type, a change in the disturbing magnitude which may possibly occur at the start will be opposed by an adjusting value which will decrease with increasing control magnitude. This process will be effected in an instable manner until the stable control starts and will not permit a stationary resting of the control at any value of the control magnitude which is below that value at which the stable control will start.

Furthermore, the control according to the invention will tend to pass as fast as possible through the instable range. Dead periods will not exist with the proportional governor according to the invention because it will work immediately after the starting of the engine.

While it is possible to obtain the same effect by providing a proportional governor of the type mentioned above with a differentially effective influence, i.e. with proportional governors in which the control magnitude is influenced by additional factors proportional to the speed of changing the control deviations, such governors, however, are considerably more complicated in construction and therefore more liable to disorder than the proportional governor according to the present invention which is extremely simple in construction.

Figure 1:
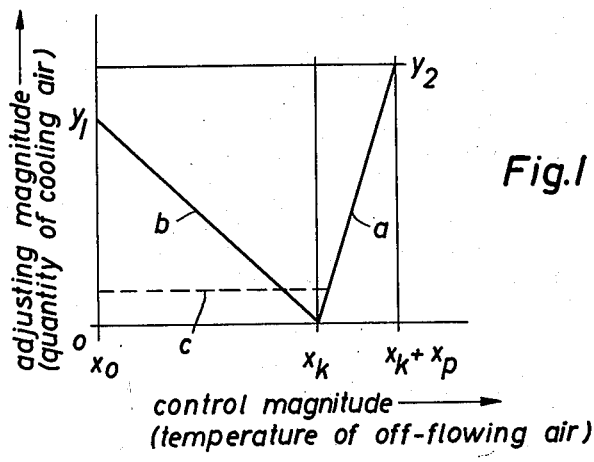
FIG. 1 represents a diagrammatic illustration of the operation of an arrangement according to the invention.

For purposes of explanation, the invention may be described by means of the diagram shown in FIG. 1. In FIG. 1 the adjusting value or magnitude is plotted on the ordinate whereas the control magnitude $x$ of the proportional governor according to the invention is plotted over the abscissa. As will be seen from the diagram, the stable control starts only at the control magnitude $x_k$ and extends between this value and a higher value $x_k + x_p$ in conformity with the characterizing line $a$, which in the present instance extends in a rectilinear manner. The adjusting magnitude $y$ may have any value between zero and $y_2$.

The governor is so designed that with an increase in the control magnitude from $x_0$ to $x_k$, the adjusting magnitude will decrease from $y_1$ to the value zero along the line $b$. Thus, the governor will, immediately following the start of the engine, begin to operate. During this operation, the control will be effected first in an instable manner according to line $b$ while the governor will have the tendency as quickly as possible to pass through the range delimited by the values $x_0$ and $x_k$. In practice, the value $y_1$ will expediently be adapted to the magnitude of the change in the disturbing magnitude to be expected directly following the start of the engine and to the period of the dead time of the governor which dead time is to be compensated for by the instable pre-control. By "dead time" is meant the time which is required by the thermostat to react to a certain temperature of the cylinder and during which time lag the governor is therefore not being adjusted or is dead.

The proportional governor according to the present invention is of particular importance for controlling the cooling of air-cooled internal combustion engines in which the temperature of the flowing off cooling air represents the control magnitude and in which the amount of cooling air controlled by the latter represents the adjusting magnitude. With the cooling control of such an engine, the start with cold engine into full load is considered the load change which is most difficult to control. While changes in the load within the control range of a proportional governor cause little if any difficulties, a certain time is required when starting with cold engine until the control magnitude reaches a value at which the adjusting magnitude will be made effective, i.e. the ordinary control will start. This delay has its reason in that the cooling air will receive heat only after those machine elements, which confine the working chambers of the engine in which heat will be freed immediately when starting the engine, have absorbed a usually considerable portion of this heat.

The cylinder bushings, which ordinarily are about five times heavier than the working pistons, will act as heat storage means inasmuch as they are not cooled during the starting period. Thus, during the starting phase of cold engines into full load, there exists the danger that after the expiration of the dead time, the cylinders acted upon by the cooling air will then shrink while the working pistons which, due to their considerably lower weight with regard to that of the cylinders, will have acquired a high temperature and will have widened correspondingly with the result that the pistons will jam. This danger is all the greater the colder the machine was when it was started. The colder the machine, the longer will be the so-called dead time in view of the different heat capacity of piston and cylinder.

This danger will be avoided by the arrangement according to the present invention according to which a temperature feeler is provided which is responsive to a change in the temperature of the off-flowing cooling air from a certain feeler temperature in increasing as well as decreasing direction, and which effects a corresponding adjustment in the flow of cooling air to the cylinder. In this way, the cylinders will already at the start of the engine be acted upon by cooling air and remain acted upon by the cooling air but to a continuously decreasing extent until the normal stable control has started.

Due to the pre-cooling referred to above, the heat which will be released in the working chambers of the cylinder will, already during the starting phase of the engine, be conducted away in a more intensive manner whereby on one hand the piston temperatures are prevented from reaching a dangerous height while the shock heretofore suffered by the cylinders at the start of the normal control, whereby a shrinking of the cylinders resulted, will be avoided. Not only in the specific case of employment described herein but also generally, for purposes of effecting the entire control operation, the adjusting magnitude may have from the very start a fixed value. With an air-cooled internal combustion engine equipped according to the present invention with a proportional governor for controlling the cooling, this would mean that directly after the starting of the engine there will already a certain amount of cooling air be passed to and through the engine which amount may be produced in a manner known per se by a small blower directly driven by the engine. This is indicated in FIG. 1 of the drawing by the dash line $c$.

When employing a proportional governor according to the invention for controlling the cooling of an air-cooled internal combustion engine, the governor may be of any suitable design. According to a particularly advantageous arrangement, it is suggested to arrange the control in such a manner that the amount of cooling air acting upon the engine varies in conformity with a quantity of liquid passing through a conduit per time unit and that in a manner likewise known per se a temperature feeler actuates a metering element for said quantity of liquid. Furthermore, for purposes of conveying the movements of the temperature feeler there is in a manner known per se employed a liquid the viscosity of which varies more or less with the temperature. As such liquid there may be used for instance lubricating oil. Furthermore, during the actuation of the metering member for the quantity of liquid, the cross sections of the passage through which the liquid passes will be varied in such a way that in conformity with the course of the temperature-viscosity of the liquid, at least in the range passed through by the feeler temperature prior to reaching the customary control range, a uniform or approximately uniform decrease in the quantity of cooling air passing through the engine will correspond to a uniform increase in the feeler temperature.

In realizing this idea, a piston valve or valve spool may be employed as metering element for the liquid. Such valve spool may be guided in a cylinder comprising a main supply passage, an auxiliary supply passage and a single discharge passage and furthermore comprising at least two further passages which may be called connecting passages representing annular chambers for establishing communication between said two feeding passages and said discharge passage, said connecting passages, said two supply passages, and said discharge passage being located relative to each other in such a way that above that feeler temperature at which the customary control starts, or in the second temperature range, the main feeding passage and, if desired, also the auxiliary supply passage will communicate with the discharge passage, whereas below said feeler temperature, or in the first temperature range, merely the auxiliary supply passage will communicate with the discharge passage. The single annular chamber or a plurality of serially arranged annular chambers which in the last mentioned instance establish the communication are so designed that in conformity with the course of the temperature-viscosity of the liquid, at least within the first temperature range passed through by the feeler temperature prior to reaching the customary control range, a uniform or approximately uniform decrease in the amount of cooling air passed through the engine will correspond to a uniform increase in the feeler temperature.

*Structural Arrangement*

Figure 2:
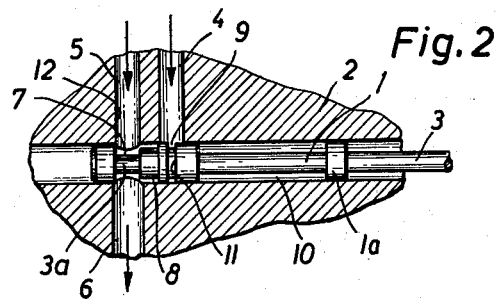
FIG. 2 illustrates a portion of an air-cooled internal combustion engine provided with a proportional governor according to the invention for controlling the valve spool which in its turn controls the cooling of the internal combustion engine, said valve spool occupying its starting position at the start of the very cold engine.

Referring now to FIG. 2, the valve spool 1 comprising a piston 1a and a piston rod 3 is reciprocably mounted in a housing 2. The adjustment of valve spool 1 is effected by a thermostat through rod 3 in conformity with the temperature of the cooling air flowing off from the engine. A movement toward the left with regard to FIG. 2 represents a reaction to the increase in the temperature of the flowing-off air, whereas a movement of the valve spool 1 toward the right with regard to FIG. 2 will result from a decrease in the temperature of the flowing-off air. The stroke performed by the valve spool is thus an indication for the adjusting magnitude, and the particular position shown in FIG. 2 corresponds to point $x_0$ of FIG. 1. Control spool 1 affects the adjusting magnitude, i.e. the amount of cooling air passing through the engine, in such a way that said valve spool directly controls the supply of filling fluid of a hydraulic slip coupling (referred to later in connection with the description of FIG. 4) through which latter a cooling air supply blower will be driven by the engine. To this end, the housing 2 for valve spool 1 is provided with a main supply passage 4, an auxiliary supply passage 5 connected to the main supply passage 4 and a discharge passage 6 leading to the coupling. The valve spool 1 comprises a plurality of recesses or passages 7, 8, 9 and 10 for effecting communication between the various passages 4, 5 and 6. The annular chamber or passage 10 serves for establishing communication between the main supply passage 4 and the discharge passage 6 during the operation of the engine. The other passages will successfully during the start of the engine establish communication between the discharge passage 6 and the auxiliary supply passage 5.

With regard to FIG. 4, the air cooled internal combustion engine shown therein is generally designated with the reference numeral 21 and has two rows of four cylinders each 22, 23, 24, 25 and 26, 27, 28, 29. The two rows are arranged at an angle with regard to each other so as to form a V-type engine, for instance in the manner shown in FIG. 2 of U.S. Patent 2,902,986. Arranged within the V-shaped chamber 30 is a shaft 31 which is driven in any convenient manner by the engine crank-shaft 32. Through the intervention of a hydraulic coupling 33 shaft 31 drives a main blower 34 designed as axial blower. The cooling air furnished by the blower 34 and heated up by passing by the cylinders 22, 23, 24, 25 is in part collected and conveyed through a collecting manifold 35 having arranged therein a thermostat 36 which controls the rod 3 of valve spool 1 in housing 2. As will be seen from FIG. 4, the housing 2 with the valve spool 1 is provided with a main supply passage 4 and an auxiliary supply passage 5 connected to a main pump 39. As mentioned above, the arrangement is such that the valve spool 1 in housing 2 will in response to a respective position of the thermostat 36 control the flow of fluid from pump 39 to coupling 33 and thereby the slip of the latter and thus the speed of the blower 34 so as to maintain the most favorable engine temperature over the entire load range of the engine. Pump 39 receives its fluid from a reservoir 40.

In order to assure that thermostat 36 will also be acted upon and will be ready to exert its control action when the blower 34 is at a standstill, for instance during a longer idling period or when the engine is under no load, shaft 31 has mounted thereon an auxiliary blower 41 near the coupling 33 which is designed as axial blower. It will be appreciated that the oil from the fluid coupling 33 will be able to return to the crank-case of the engine through conduit 43 and an adjustable throttle 42.

*Operation*

In the particular position occupied by the valve spool 1 in FIG. 2, no communication exists between the main supply passage 4 and the discharge passage 6, whereas communication is established between discharge passage 6 and auxiliary supply passage 5 through the annular chamber 7. If the engine is now started, the blower immediately supplies cooling air inasmuch as the hydraulic coupling is acted upon. As soon as the thermostat registers a temperature increase, it moves valve spool 1 toward the left with regard to FIG. 2 so that the effective portion of passage or groove 7 located in the passage of the filling fluid for the hydraulic coupling will gradually be reduced and eventually be replaced by the piston 8 which has a diameter less than the piston 1a. Inasmuch as the diameter of piston 8 is larger than the previously effective rod section 3a, the just described displacement of valve spool 1 results in a throttling of the flow of filling fluid to the coupling and thereby in a reduction in the adjusting magnitude or adjusting factor.

Figure 3:
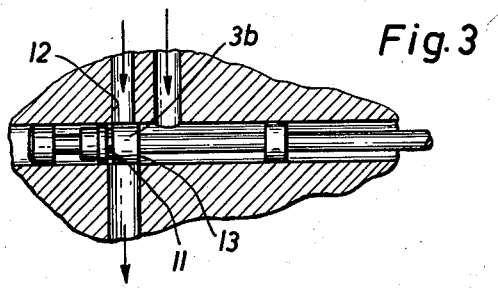
FIG. 3 is a partial section similar to that of FIG. 2 but showing the valve spool in a position which it will occupy at the start of the normal control.

When valve spool 1 is displaced further toward the left with regard to FIG. 2, groove 9 will move into the path from passage 5 to passage 6 and will thus become effective. The distance between groove 9 and passage 10 is so selected that at the instant at which edge 11 of groove 9 and edge 12 of auxiliary supply passage 5 are in alignment with each other, not only the connection between auxiliary supply passage 5 and discharge 6 will be interrupted but there will also not exist any communication between the discharge passage 6 and the main supply passage 4. This position of the valve spool 1 is shown in FIG. 3. The pre-control is thus terminated which means that the quantity of cooling air passing through the engine has dropped to substantially zero.

When valve spool 1 is displaced further toward the left with regard to FIG. 2, the edge 13 of the piston portion 3b of valve spool 1 will permit communication between main passage 4 and discharge passage 6 so that the coupling will again be acted upon by pressure fluid from main passage 4. The quantity of cooling air passing through the engine, therefore, will again increase from zero.

When the valve spool 1 moves from right to left with regard to the drawing, the control will be unstable until the edge 13 of piston section 3b has moved so far that communication between passages 5 and 6 is established. This unstable control is due to the fact that with increasing thermostat temperature in other words with increasing control magnitude, the adjusting magnitude, i.e. the quantity of cooling air passing through will decrease continuously. When edge 13 has moved toward the right to such an extent that communication between the passages 5 and 6 has been established, the stable control will start at which the adjusting magnitude increases with increasing control magnitude.

The starting position of the valve spool 1 when the engine is cold will depend on the respective temperature of the air surrounding the engine. The lower this temperature, the more will the valve spool be located toward the right with regard to the drawing which means the greater will be the quantity of cooling air passing through the engine right at the start thereof. The dimensioning of the cross sections of the passages 7, 8, and 9 has to be effected in conformity with the lowest possible temperature which may surround the engine and also under consideration of the course of the temperature-viscosity of the filling fluid for the coupling. The difference between the said three cross sections is to be selected advantageously in such a way that the characteristic line for the unstable pre-control is approximately a straight line as indicated in FIG. 1. The purpose of the passage 9 in the present instance consists primarily in, directly prior to the start of the stable control, once more to raise the adjusting magnitude in order in this way to assure a smooth transition from the unstable pre-control to the stable control. However, this passage 9 may be omitted if another device is provided for instance a small engine driven blower, which will assure that always, i.e. independently of the control magnitude, a small quantity of cooling air will pass by the engine.

It is, of course, to be understood that the present invention is, by no means, limited to the particular arrangement shown in the drawing but also comprises any modifications within the scope of the appended claims.

What I claim is:
1. In a cooling system for an air cooled internal combustion engine,
blower means supplying cooling air to said engine immediately after the start of said engine so that the temperature of the cooling air passed by said engine increases continuously,
control means to control the supply of cooling air from said blower to said engine operable through a first temperature range to decrease the supply of air to said engine as the temperature of said engine increases and operable through a second temperature range to increase the supply of air to said engine as the temperature of said engine increases,
thermostatic means responsive to the temperature of said cooling air after having passed said engine to activate said control means through said first temperature range until the temperature of said air passed by said engine reaches a certain value and to actuate said control means through said second temperature range after the temperature reaches said certain value.

2. In the system claimed in claim 1, a hydraulic power conveying means interconnecting said engine and blower means to drive the latter from the engine, and conduit means conveying fluid from a fluid source to said hydraulic power conveying means,
said control means including valve means in said conduit for controlling the supply of fluid through said conduit means to said hydraulic power conveying means and said thermostatic means operating said valve means so as to control the fluid to said hydraulic means in said first temperature range to decrease the flow of air delivered by said blower means as the temperature of said engine increases.

3. In the system claimed in claim 2, in which said thermostatic means also operates said valve means in said conduit to control the flow of fluid to said hydraulic means in said second temperature range to increase the flow of air delivered by said blower means with increase of temperature above said first range.

4. In the system claimed in claim 1, in which said control means includes first valve means operated by said thermostatic means effective to control the flow of air delivered by said blower means through said first temperature range and
- second valve means operated by said thermostatic means effective to control the flow of air delivered by said blower means through said second temperature range.

References Cited in the file of this patent

UNITED STATES PATENTS 2,558,937    Dillman _____ July 3, 1951

FOREIGN PATENTS 709,445    France _____ May 18, 1931